United States Patent [19]
Bedell et al.

[11] Patent Number: 4,960,576
[45] Date of Patent: Oct. 2, 1990

[54] H₂S ABATEMENT IN GEOTHERMAL STEAM DURING STACKING OPERATIONS

[75] Inventors: Stephen A. Bedell; Charles A. Hammond; Larry H. Kirby, all of Lake Jackson, Tex.

[73] Assignee: The Dow Chemical Company, Midland, Mich.

[21] Appl. No.: 359,896

[22] Filed: Jun. 1, 1989

[51] Int. Cl.⁵ ............... C01B 17/16; C01B 31/20; C01B 17/02
[52] U.S. Cl. .................. 423/226; 210/718; 210/750; 423/576.6; 423/DIG. 19
[58] Field of Search ............ 423/226, 576.6, DIG. 19; 210/718, 750

[56] References Cited

U.S. PATENT DOCUMENTS

| | | | |
|---|---|---|---|
| 4,468,929 | 8/1984 | Jernigan | 60/641.2 |
| 4,528,169 | 7/1985 | La Mori et al. | 423/224 |
| 4,629,608 | 12/1986 | Lampton | 423/226 |
| 4,696,802 | 8/1987 | Bedell | 423/226 |

OTHER PUBLICATIONS

Chemical Engineer's Handbook, Fifth Edition Perry, 1973, pp. 18-87.

*Primary Examiner*—John Doll
*Assistant Examiner*—Lori F. Cuomo

[57] ABSTRACT

A process for abating hydrogen sulfide during geothermal steam stacking operations is disclosed. The geothermal steam to be stacked is introduced into a geothermal steam stacking line. Ferric chelating solution is injected into the stacking line in an amount effective to convert the hydrogen sulfide in the steam to sulfur. The hydrogen sulfide-abated steam and chelating solution is vented through a rock muffler and the chelating solution is optionally recovered from the muffler, regenerated and recirculated to the injection step.

17 Claims, 1 Drawing Sheet

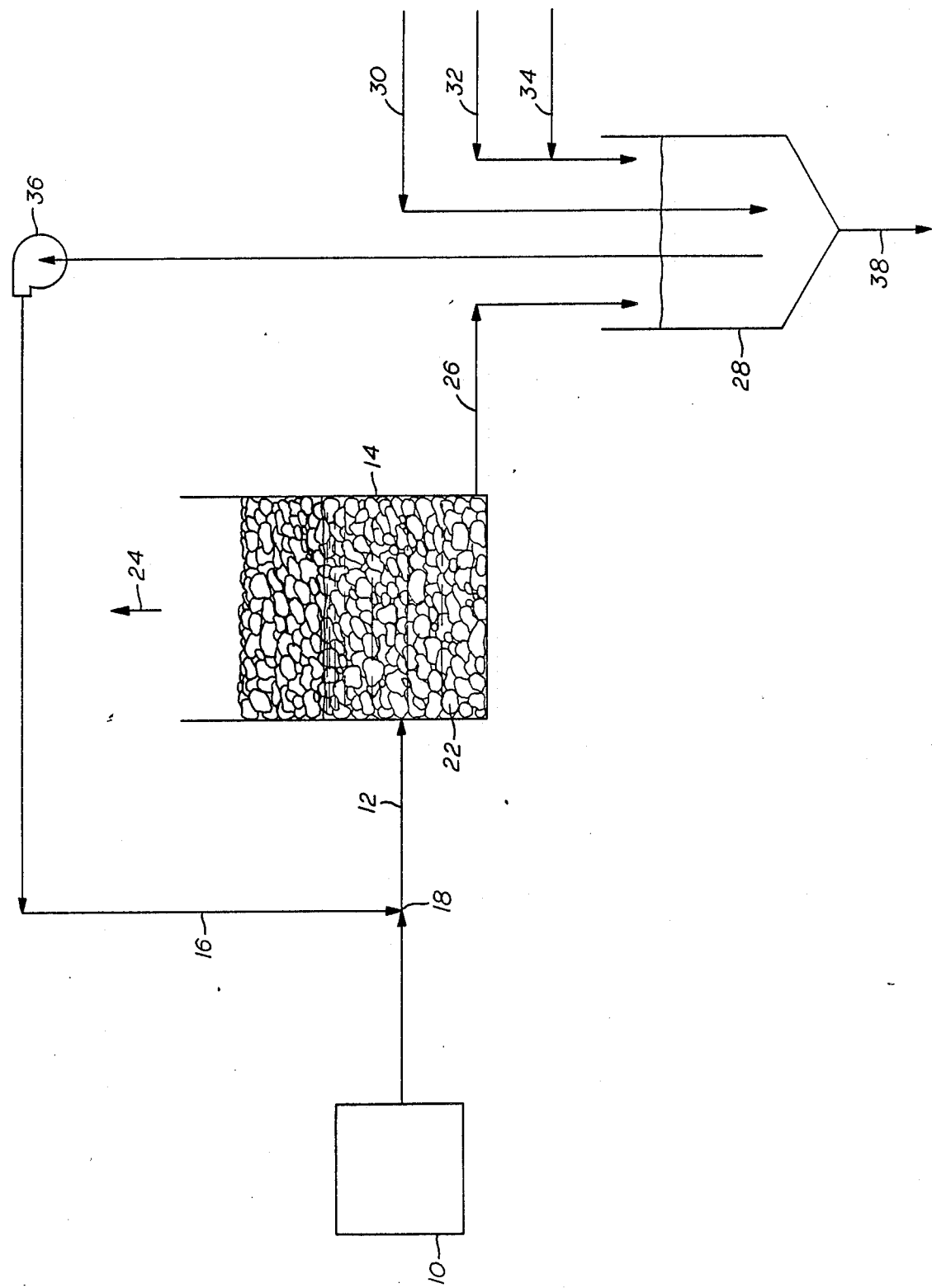

H₂S ABATEMENT IN GEOTHERMAL STEAM DURING STACKING OPERATIONS

FIELD OF THE INVENTION

The present invention relates to the abatement of $H_2S$ from geothermal steam during stacking operations, and more particularly to such $H_2S$ abatement using iron chelate solutions.

BACKGROUND OF THE INVENTION

It is widely known to use geothermal steam obtained from geothermal wells to generate electrical power in geothermal power plants. One problem heretofore extant with the production of geothermal power has been the abatement or removal of hydrogen sulfide from geothermal steam before the discharge thereof to the environment. Various technology is in place for the abatement of hydrogen sulfide during the drilling of geothermal wells, and also in the treatment of steam condensate from the turbine through which the geothermal steam is expanded to generate electrical power. Exemplary of such technology are U.S. Pat. Nos. 4,696,802; 4,629,608; and 4,468,929. Even efforts by geothermal steam suppliers to prevent the discharge of the geothermal steam from geothermal steam gathering systems that supply geothermal power plants have been reasonably successful in spite of the size and complexity of the systems typically employed.

However, one major difficulty persists, that of disposing of geothermal steam during geothermal power plant outages. The usual action taken on shutdown of a power plant is to vent steam at a reduced flow through a noise silencer or muffler to the atmosphere. This procedure is commonly referred to in the industry as "steam stacking", and this term is used inclusively of venting of steam during power plant shutdowns or outages, either scheduled or unscheduled.

Steam stacking is generally less than satisfactory from both environmental and resource conservation points of view. The steam supplier does not ordinarily incorporate process equipment for removing $H_2S$ from steam supplied to the power plant. Thus, when steam is stacked by the supplier, hydrogen sulfide is released unabated to the atmosphere. To ensure that hydrogen sulfide emissions do not exceed regulated levels, measures are necessary either to remove the hydrogen sulfide from the stacked steam or to handle the steam in such a way that it will not be vented to the atmosphere. It has been suggested to remove hydrogen sulfide from the steam before it enters the geothermal plant. Another possibility includes diverting the steam around the power plant turbine, i.e. a turbine bypass, to the condenser and the downstream hydrogen sulfide abatement equipment, e.g. Stretford and/or hydrogen peroxide-supplemented catalyst processes. It has further been suggested to reroute the steam to another power plant or to construct dual, parallel geothermal plants supplied with steam from a single steam gathering system. All of these strategies have inherent limitations and disadvantages.

SUMMARY OF THE INVENTION

The present invention provides a method for abating hydrogen sulfide during geothermal steam stacking operations. In one aspect, the invention provides a method which includes the steps of:

(a) introducing the geothermal steam to be stacked into a geothermal steam stacking line;

(b) injecting ferric chelating solution into the stacking line in an amount effective to substantially convert hydrogen sulfide in the steam to sulfur, whereby at least a portion of said ferric chelate is reduced to ferrous chelate;

(c) venting the steam and chelating solution through a rock muffler; and (d) optionally, regenerating and recirculating chelating solution condensed in the muffler to the injection step.

In another aspect, the invention provides a method which includes the steps of:

(a) injecting ferric chelating solution into a geothermal steam stacking line vented through a rock muffler, sufficiently upstream from the rock muffler and in an amount effective to abate hydrogen sulfide in the steam, whereby the hydrogen sulfide is converted to elemental sulfur and the ferric chelate is reduced to ferrous chelate;

(b) collecting the chelating solution and the sulfur in the rock muffler;

(c) withdrawing the chelating solution from the muffler;

(d) separating the sulfur from the chelating solution; and (e) oxidizing the chelating solution to regenerate the ferrous chelate to ferric chelate for reuse in the injection step.

BRIEF DESCRIPTION OF THE DRAWING

The figure of the drawing illustrates a hydrogen sulfide abatement process in a steam stacking operation in accordance with the present invention.

Geothermal power plant 10 supplies steam during stacking operations to the line 12 and thence to rock muffler or silencer 14, or another conventional device for reducing the noise of the vented steam. Iron chelate formulation from line 16 is injected via conventional open hoses or spray nozzles at point 18 into line 12. The chelating solution reacts with the hydrogen sulfide in the steam in line 12, and the abated steam exits the top of muffler 14 to the atmosphere at 24. The chelate solution and any condensed steam are collected in the rock muffler basin 22. The fluid collecting in the rock muffler basin 22, along with entrained sulfur produced by the abatement of the steam with the chelate solution, is removed through line 26 into vessel 28. In vessel 28 the sulfur is separated from the solution by settling, although any other conventional sulfur separation means may be used. The reduced iron chelate is reoxidized in vessel 28 by sparging air through line 30. Makeup chelate solution to maintain the desired iron concentration may be added through line 32, and a base may be added to maintain the desired pH through line 34. Water imbalances in the system may be addressed by overflowing a portion of the solution from vessel 28, or adding makeup water thereto. Regenerated iron chelate solution is then pumped through line 16 by pump 36 for injection into line 12 as described above. Sulfur solids and other accumulated debris are removed from the vessel 28 by means of line 38.

The positioning of the line 12 entry into the muffler 14 may be adjusted as desired to allow for maximum reaction time as the chelate/sulfide mixture passes through the rocks in the muffler 14, but in most cases residence times can be increased by placement of injection point 18 further upstream from the muffler 14 in line 12.

DETAILED DESCRIPTION OF THE PREFERRED EMBODIMENTS

In the present process, hydrogen sulfide in geothermal steam is abated during stacking operations using a ferric chelating solution. Chelating agents useful in preparing the ferric chelate of the present invention include those chelating or complexing agents which form a water-soluble chelate. Representative of such chelating agents are the aminocarboxylic acids such as nitrilotriacetic acid, N-hydroxyethylaminodiacetic acid, ethylenediaminetetraacetic acid, N-hydroxyethylethylenediaminetriacetic acid, diethylenetriaminepentaacetic acid, cyclohexanediaminetetraacetic acid, triethylenetetraaminehexaacetic acid and the like, including the salts thereof. Another useful chelating agent is lignosulfonate. Of such chelating agents, ethylenediaminetetraacetic acid, N-hydroxyethylethylenediaminetriacetic acid and N-hydroxyethyliminodiacetic acid, are most advantageously employed in preparing the ferric chelate used herein. The chelated iron concentrations in the solution injected into the steam line upstream of the muffler should be in the range from 100 to 20,000 ppm of iron, and preferably in the range from 1,000 to 3,000 ppm.

If desired, one or more of various cationic polymeric catalysts may be present in the chelating solution injected into the stacking line to accelerate the conversion of hydrogen sulfide. Examples of useful cationic polymeric catalysts to be used include polyethyleneamines, poly(2-hydroxypropyl-1-N-methyl-ammonium chloride), poly(2-hydroxypropyl-1,1-N-dimethylammonium chloride), poly[N-(dimethylamino-methyl)]-acrylimide, poly(2-vinylimidazolinium bisulfate, poly(diallyldimethylammoniumchloride) and poly(N-dimethylaminopropyl)methacrylamide. These cationic polymers are well known and are commercially available under various trade names. See, for example, *Commercial Organic Flocculants* by J. Vostrcil, et al., Noyes Data Corporation 1972 which is incorporated by reference herein. Other useful cationic catalysts are set forth in *J. Macromol. Science-Chem. A*4, pp. 1327–1417 (1970) which is also incorporated by reference herein. These catalysts are used in the chelating solution at a concentration in the range of 25–3000 ppm. A preferred range is 50–500 ppm. The most preferred range is 150–300 ppm. It is to be understood that these ranges are considered to be effective amounts of the catalysts. The use of amounts less than these ranges does not generally have the desired effect. The use of amounts more than these ranges are not generally economical.

The rate of injection of the chelate solution depends on the hydrogen sulfide level in the geothermal steam being stacked, and also the rate at which the geothermal steam is stacked. In general, the injection rate should be sufficient to provide 1 to 6 moles and preferably 2 to 4 moles, of ferric chelate for every mole of hydrogen sulfide entering the reaction zone, i.e. the vent line 12.

The contact time of the reactants in the vent line 12 and/or the muffler 14 should be at least 0.05 seconds or more, and preferably in the range from 0.2 to 1.0 seconds.

The pH of the injected ferric chelate solution should be in the range from 7 to 11 and preferably in the range from 9.5 to 10.5. Below the pH level of 7, hydrogen sulfide removal is less effective, and above the level of 11, the injected solution does not retain the ferric chelate in soluble form.

The chelate solution and any steam condensate are collected in the muffler rock basin 22, and may be drained for disposal from the muffler 14. Alternatively, the entire contents of the rock muffler, i.e. rocks, sulfur, chelating solution, and condensate, if any, may be disposed of together. In a preferred embodiment, illustrated in the figure of the drawing, the chelating solution and entrained sulfur solids are withdrawn from the rock muffler 14 for regeneration of the chelate solution. The sulfur solids may be separated from the ferric chelate solution in a separation zone. In general, a settling tank or vessel is provided having a capacity such that there is a residence time of the chelate solution in the range from 0.1 to 5 hours and preferably in the range from 1 to 2 hours.

In the aeration or converting step, air or an oxygen-containing gas is sparged into the ferrous chelating solution at a rate to provide at least 0.5 mole of oxygen per moles of hydrogen sulfide being treated. In general, the ratio is from 0.6 to 20.0 moles of oxygen per mole of hydrogen sulfide and preferably the rate is 1 to 10 moles of oxygen per mole of hydrogen sulfide.

The sulfur separation step, as well as the regeneration step, may be carried out continuously or batchwise. Batch collection of the chelating solution/sulfur mixture is preferred for intermittent or periodic stacking operations as well as for stacking of short duration, whereas for continuous stacking operations or stacking operations of longer duration, continuous settling and regeneration is preferred, depending upon the capacity of the rock muffler and settling/regeneration equipment.

In a batch operation, the chelating solution/sulfur is collected in the vessel 28 during the stacking of the geothermal steam. When the stacking is completed, the sulfur may then be allowed to settle out from the chelating solution in a first step, and after the settling is completed, the chelating solution is thereafter regenerated for the next stacking sequence. Alternatively, the regeneration step may be carried out before the settling step.

For a continuous operation, it may, in some instances, be desirable to provide separate settling and regeneration zones and/or vessels since the sparging of air into the vessel 28 may adversely affect the settlement of sulfur solids therein.

Various changes and modifications of the invention will become apparent to those skilled in the art in view of the foregoing description which is merely illustrative and explanatory of the invention. All such changes and modifications which fall within the scope and spirit of the appended claims are intended to be embraced thereby.

What is claimed is:

1. A method of abating hydrogen sulfide in stacked geothermal steam consisting essentially of the steps of:
    injecting ferric chelating solution into a geothermal steam stacking line vented through a rock muffler directly to the atmosphere, sufficiently upstream from said rock muffler wherein the steam and injected chelating solution have a contact time of 0.2–1.0 seconds, and in an amount effective to abate hydrogen sulfide in said geothermal steam vented therethrough, whereby the hydrogen sulfide therein is substantially converted to elemental sulfur and the ferric chelate is reduced to ferrous chelate;

collecting said chelating solution and said sulfur in a basin in said rock muffler;

withdrawing said chelating solution from said basin;

separating said sulfur from said chelating solution; and oxidizing said chelating solution to regenerate said ferrous chelate to ferric chelate for reuse in said injection step.

2. The method of claim 1, wherein said ferric chelate is ferric aminocarboxylic acid chelate.

3. The method of claim 1, wherein said ferric chelate is the ferric chelate of chelating agents selected from the group consisting of nitrilotriacetic acid, N-hydroxyethyl aminodiacetic acid, ethylenediamine tetraacetic acid, N-hydroxyethylethylenediamine triacetic acid, diethylenetriamine pentaacetic acid, cyclohexanediaminetetraacetic acid, triethylenetetraamine hexaacetic acid, and salts thereof.

4. The method of claim 1, wherein said ferric chelate is the ferric chelate of lignosulfonate.

5. The method of claim 1, wherein said ferric chelate is the ferric chelate of ethylene diamine tetraacetic acid, N-hydroxyethylethylediamine-triacetic acid, or N-hydroxyethyliminodiacetic acid.

6. The method of claim 1, wherein the injected solution has a chelated iron concentration of 100-20,000 ppm iron.

7. The method of claim 5, wherein the injected chelating solution has a chelated iron concentration of 1000-3000 ppm iron.

8. The method of claim 1, wherein said injection is at a rate sufficient to provide 1-6 moles of ferric chelate per mole of hydrogen sulfide in said stacked steam.

9. The method of claim 7, wherein said injection is at a rate sufficient to provide 2-4 moles of ferric chelate per mole of hydrogen sulfide in said stacked steam.

10. The method of claim 1, wherein the steam and chelating solution have a contact time of at least 0.5 seconds.

11. The method of claim 1, wherein the injected chelating solution has a pH of 7-11.

12. The method of claim 1, wherein the injected chelating solution has a pH of 9.5-10.5.

13. The method of claim 1, wherein the chelating solution includes 25-3000 ppm of cationic polymeric catalyst.

14. The method of claim 12, wherein the chelating solution comprises 50-500 ppm of cationic polymeric catalyst.

15. The method of claim 1, wherein said separating and oxidizing steps are effected in separate vessels.

16. The method of claim 1, wherein said separation and oxidation steps are batchwise.

17. The method of claim 15 wherein said separation and oxidation steps are continuous.

* * * * *